(12) United States Patent
Mason

(10) Patent No.: US 9,719,243 B2
(45) Date of Patent: Aug. 1, 2017

(54) STRUT CONNECTOR

(71) Applicant: Paul H. Mason, Minden, NV (US)

(72) Inventor: Paul H. Mason, Minden, NV (US)

( * ) Notice: Subject to any disclaimer, the term of this patent is extended or adjusted under 35 U.S.C. 154(b) by 0 days.

(21) Appl. No.: 14/980,529

(22) Filed: Dec. 28, 2015

(65) Prior Publication Data
US 2017/0167516 A1    Jun. 15, 2017

Related U.S. Application Data

(60) Provisional application No. 62/264,991, filed on Dec. 9, 2015.

(51) Int. Cl.
*E04B 1/19* (2006.01)
*F16B 7/18* (2006.01)
*E04B 1/24* (2006.01)
*E04B 1/32* (2006.01)

(52) U.S. Cl.
CPC ............ *E04B 1/1903* (2013.01); *F16B 7/185* (2013.01); *E04B 2001/1924* (2013.01); *E04B 2001/1957* (2013.01); *E04B 2001/1963* (2013.01); *E04B 2001/2409* (2013.01); *E04B 2001/3247* (2013.01)

(58) Field of Classification Search
CPC ........... E04B 1/1903; E04B 2001/1924; E04B 2001/1936; E04B 2001/1957; E04B 2001/1963; E04B 2001/2406; E04B 2001/2409; E04B 2001/3247; F16B 7/185
See application file for complete search history.

(56) References Cited

U.S. PATENT DOCUMENTS

| | | | | |
|---|---|---|---|---|
| 4,247,218 A * | 1/1981 | Jeannin | ............... | E04B 1/1903 403/217 |
| 4,280,521 A * | 7/1981 | Zeigler | ............... | E04B 1/1909 135/120.3 |
| 5,224,320 A * | 7/1993 | Mai | ............... | E04B 1/1903 403/171 |
| 5,483,780 A * | 1/1996 | Stumpf | ............... | E04B 1/1903 52/650.3 |
| 5,797,695 A * | 8/1998 | Prusmack | ............... | E04H 15/32 135/145 |

(Continued)

FOREIGN PATENT DOCUMENTS

| ES | WO 2012156562 A1 * | 11/2012 | ......... E04G 21/3276 |
|---|---|---|---|
| ES | EP 2743426 A1 * | 6/2014 | ......... E04G 21/3276 |

(Continued)

*Primary Examiner* — Adriana Figueroa
*Assistant Examiner* — Jessie Fonseca
(74) *Attorney, Agent, or Firm* — Dergosits & Noah LLP; Todd A. Noah

(57) ABSTRACT

A strut connector for use with a hollow strut having at least one a pair of opposed openings formed in the strut. A pair of identical connector portions are rotatably coupled together, with one of the connector portions inverted. Each connector portion is a flat blade having a body portion and an arm portion extending from the body portion. The body portion has a first hole and a second hole. The arm portion has at least one tab extending from the arm portion at an angle. The arm portions are coupled together via the first hole, then rotated to engage respective openings on the strut with the tabs. The second holes are aligned and a fastener secured through the second holes.

10 Claims, 19 Drawing Sheets

(56) References Cited

U.S. PATENT DOCUMENTS

| | | | | |
|---|---|---|---|---|
| 8,820,025 B1* | 9/2014 | Rochas | ................ | E04B 1/1906 52/638 |
| 2003/0226319 A1* | 12/2003 | Richards | .............. | E04B 1/3211 52/80.1 |
| 2010/0005752 A1* | 1/2010 | Hawkins | .............. | E04B 1/1903 52/655.1 |
| 2015/0059263 A1* | 3/2015 | Pacaci | ...................... | E04B 1/24 52/143 |

FOREIGN PATENT DOCUMENTS

| | | | | |
|---|---|---|---|---|
| GB | 395835 A | * | 7/1933 | ............ E04B 1/4114 |
| GB | 1435689 A | * | 5/1976 | ............... E04G 5/04 |

* cited by examiner

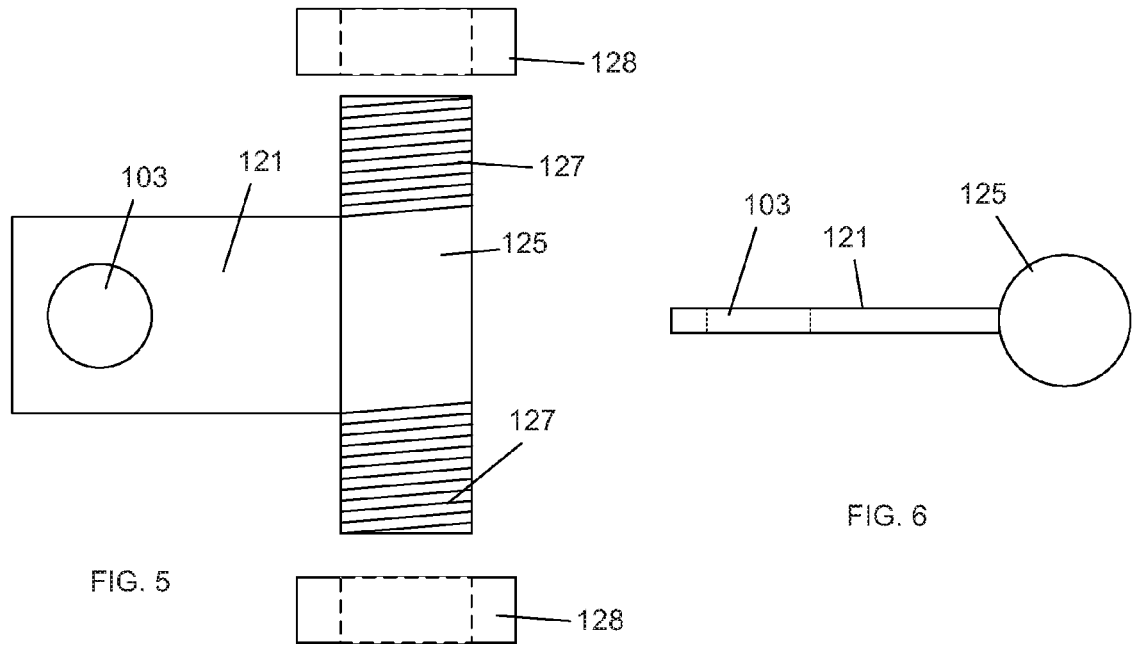
FIG. 5
FIG. 6
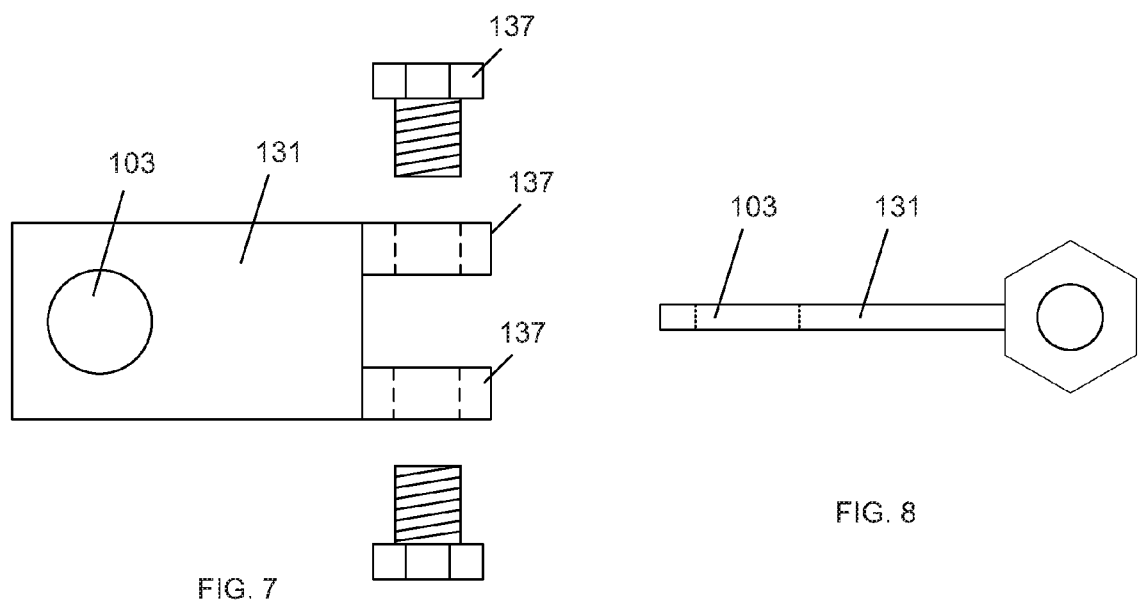
FIG. 7
FIG. 8

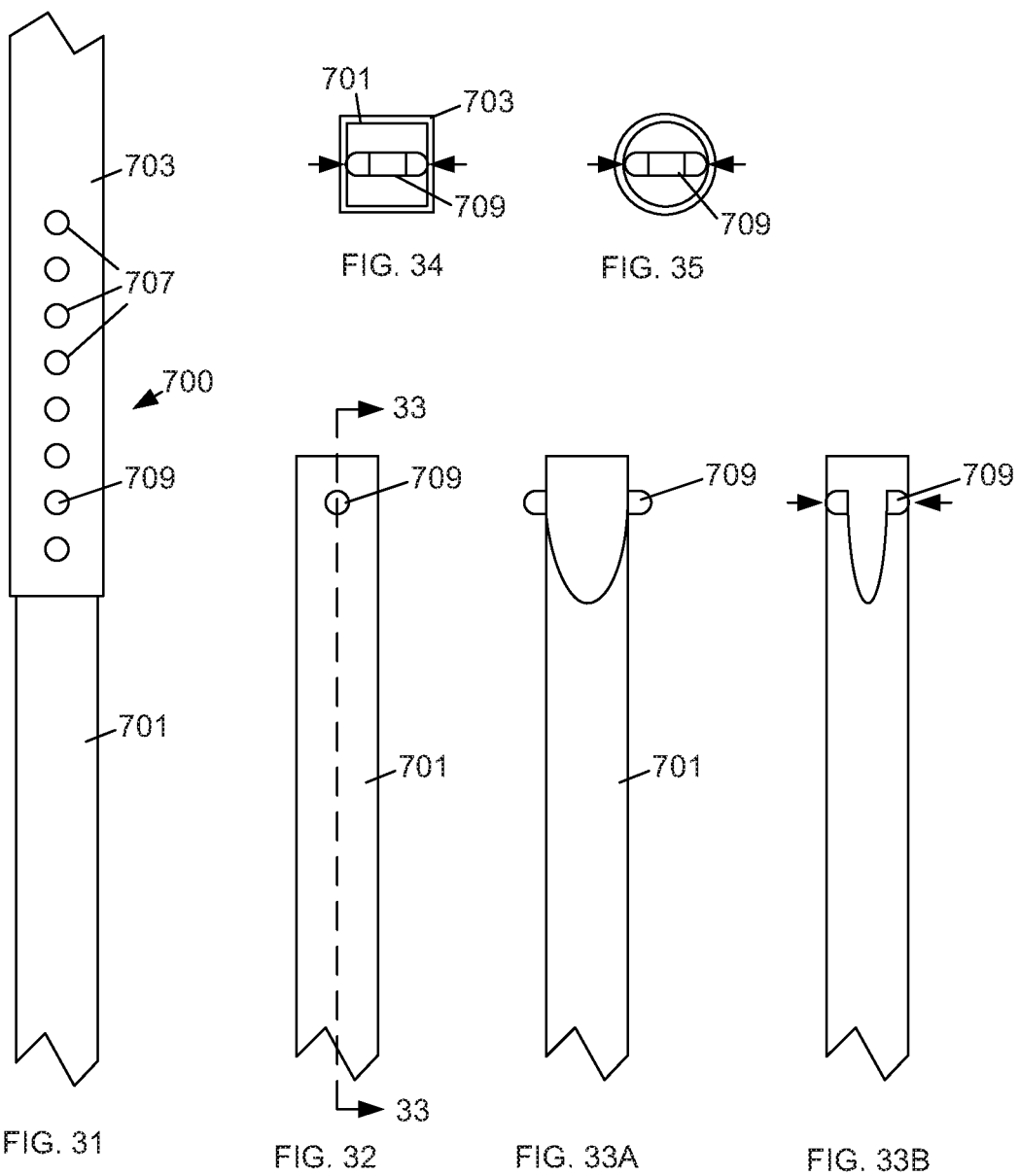

STRUT CONNECTOR

CROSS REFERENCE TO RELATED APPLICATIONS

This application claims priority under 35 U.S.C. §119 or the Paris Convention from U.S. Provisional Patent Application No. 62/264,991, filed Dec. 9, 2015, the entire contents of which is incorporated herein by reference as if set forth in full herein.

BACKGROUND

There are many connectors currently available for connecting the ends of various elongated framing components including: beams, posts, etc. While these connectors are commonly used for normal construction which involves primarily right or 90 degree angles, there are very few connectors that provide the required strength for other multiple angle junctions. Multiple angle connectors can be particularly important for complex framing geometries for structures such as geodesic domes.

SUMMARY

This disclosure is directed towards a double axis frame strut having a strut frame and a tongue that extends from a distal end of the strut frame. The tongue can be rigidly coupled to an axle that can be rotatably coupled to the strut frame. The tongue extends from a distal end of the strut frame. The tongue can rotate relative to the strut frame and the tongue can include a hole which can be coupled to other double axis frame struts or other structure. The hole in the tongue can define a first axis of rotation and the axle can define a second axis of rotation. The axis of the hole in the tongue can be perpendicular to the axis of rotation of the tongue relative to the strut frame.

In different embodiments, there can be various different tongue and strut frame designs. These different tongues and strut frames can be mixed and matched to best suit the needs of the structure being assembled. In some embodiments, the tongue can rotate freely within a limited range of angles. This can be useful when a high strength structure is required but the coupling points between the adjacent elongated members needs to be flexible. For example, if the structure expands and contracts due to factors such as thermal expansion, this loose configuration may be suitable. In other embodiments, the tongue can be rotated within the strut frame but can also be locked or rigidly secured into a set position. In these embodiments, the axle may include a threaded bolt and nut that can be tightened to clamp the strut frame to the tongue and prevent relative movement.

The holes in the tongues of the double axis frame struts can be coupled together with a fastener such as a nut and bolt. The double axis frame struts can be arranged in a radial configuration around the bolt. When the desired positions of the double axis frame strut are set, the nut and bolt can be tightened to secure the double axis frame struts. These hub connections can normally include between 2 and 6 double axis frame struts. The inventive double axis frame struts can be used for framing various types of structures including geodesic domes and more traditional free standing or supported structures.

BRIEF DESCRIPTION OF THE DRAWINGS

FIGS. 5 and 6 illustrate top and side views of a third embodiment of a tongue;

FIGS. 7 and 8 illustrate top and side views of a forth embodiment of a tongue;

FIGS. 31-35 illustrate views of an adjustable length beam.

DETAILED DESCRIPTION

This disclosure is directed towards a double axis frame strut. In an embodiment, the double axis frame strut can consist of a tongue and a strut frame. The tongue extends from a distal end of the strut frame. The tongue can rotate relative to the strut frame and the tongue can include a hole which can be coupled to other double axis frame struts or other structure. The center axis of the hole in the tongue can define one axis of rotation and the rotation of the tongue relative to the strut frame can define the second axis of rotation. The axis of the hole in the tongue can be perpendicular to the axis of rotation of the tongue relative to the strut frame.

A proximal end of the double axis frame strut can be attached to an elongated member such as tubing, pipe, beams, etc. and the elongated member can be made of various materials including: plastic, metal, wood, composites, etc. The tongue at the distal end of the frame strut can be bolted and connected to an axis point adjoining to other double axis frame struts at locked various angles to form any desired framing necessary. The framing that is fabricated with the double axis frame struts can be used for various structures including: gazebos, small buildings, green houses, pavilions, umbrellas, rescue equipment, etc. The framing can be constructed on level surfaces or on uneven ground. In other embodiments, the double axis frame struts can be used in scaffolding, safety manhole boxes, trench shoring, universal tripods, shelving, carports, walkway covers, trussing and any other framing systems.

The inventive double axis frame strut can have various configurations. Two components of the double axis frame strut are the tongue and the strut frame. The tongue and strut frame can each have various different designs and constructions. It is also possible to mix and match the different tongue and strut frame designs. Thus, the tongues and strut frames will be described separately but one of ordinary skill in the art will know that these different tongue and strut frame designs can be mixed and matched.

Figure 1:
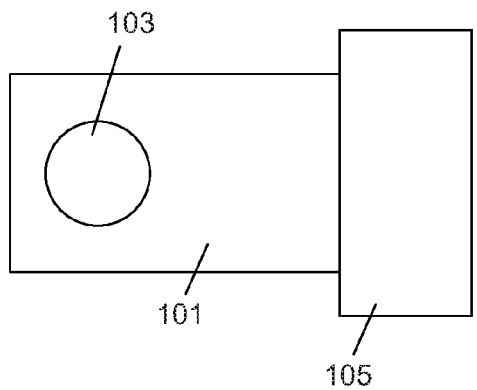
FIGS. 1 and 2 illustrate top and side views of a first embodiment of a tongue.
Figure 2:
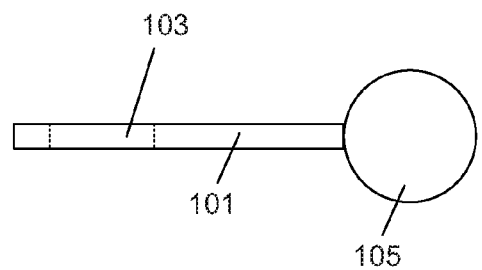

With reference to FIGS. 1-8 different embodiments of the tongue are illustrated. FIG. 1 illustrates a top view of a first embodiment of a tongue and FIG. 2 illustrates a side view of the first embodiment of the tongue. A distal portion of the double axis tongue 101 can include a mounting hole 103 and a proximal end of the tongue can be coupled to a cylinder 105. The axis of the cylinder 105 can be perpendicular to the length of the tongue 101 and parallel to the plane of the tongue 101. The tongue 101 can be made from sheet metal and the cylinder 105 can be made from a metal cylindrical rod. The tongue 101 can be coupled to the cylinder 105 by welding the tongue 101 to the cylinder 105. The length of the cylinder 105 can be longer than the width of the tongue 101 and ends of the cylinder 105 can extend beyond the width of the tongue 101.

Figure 3:
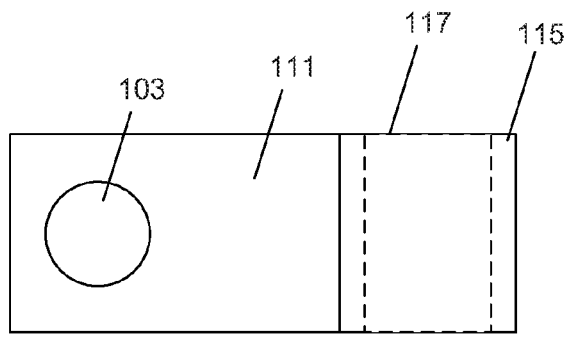
FIGS. 3 and 4 illustrate top and side views of a second embodiment of a tongue.
Figure 4:
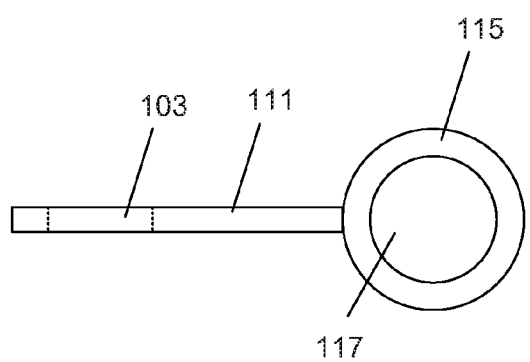

FIG. 3 illustrates a top view and FIG. 4 illustrates a side view of a second embodiment of a tongue 111. In this embodiment, the tongue 111 is coupled to a tube 115 having a through bore 117. The axis of the bore 117 can be perpendicular to the length of the tongue 111 and parallel to the plane of the tongue 111. The cylinder 115 can be made of metal tubing and the tongue 101 can be welded to the cylinder 105. The length of the tube 115 can be equal or longer than the width of the tongue 101.

FIG. 5 illustrates a top view and FIG. 6 illustrates a side view of a third embodiment of a tongue 121. The axis of the cylinder 125 can be perpendicular to the length of the tongue 121 and parallel to the plane of the tongue 121. The tongue 121 and the cylinder 125 can be made of metal and the tongue 121 can be welded to the cylinder 125. The length of the cylinder 125 can be longer than the width of the tongue 121 and ends of the cylinder 125 can extend beyond the width of the tongue 121 and the ends or the entire cylinder 125 can be threaded 127. When installed in the strut frame, the threaded ends 127 of the cylinder 125 can be secured to nuts having corresponding threads to secure the tongue 121 to the strut frame.

FIG. 7 illustrates a top view and FIG. 8 illustrates a side view of a forth embodiment of a tongue 131. In this embodiment, the end of the tongue can be welded or coupled in any other manner to two threaded nuts 135. In other embodiments, the nuts 135 can be replaced with any other suitable structures that have internal threads. The axis of the cylinder 125 can be perpendicular to the length of the tongue 131 and parallel to the plane of the tongue 131. In this embodiment, the nuts 135 can be coupled to bolts 137 having corresponding threads. Although illustrated as two separate nuts 135 in other embodiments, the tongue 131 can be coupled to a single threaded nut or tubular structure that extends across the entire width of the tongue 131.

Figure 9:
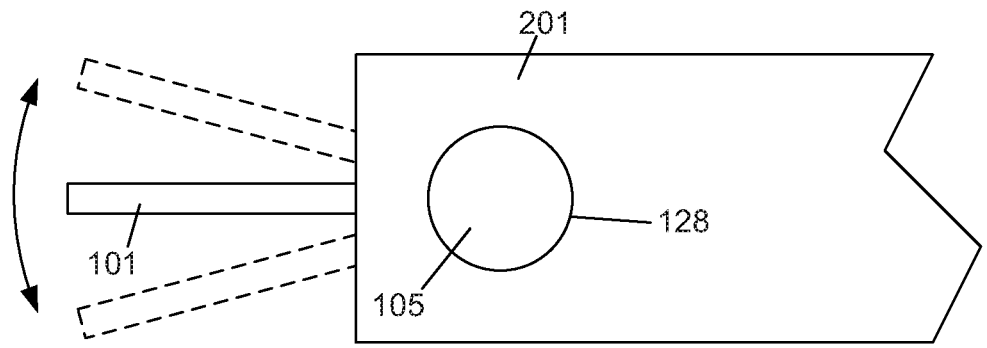
FIGS. 9-11 illustrate side, front and top views of a first embodiment of the double axis frame strut.
Figure 10:
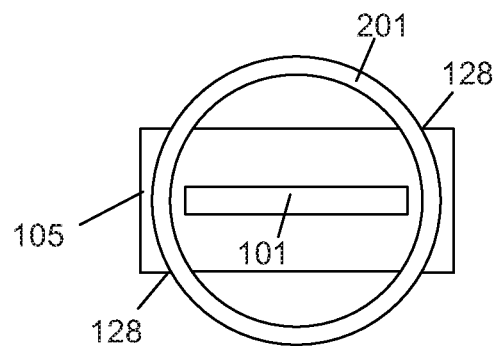
Figure 11:
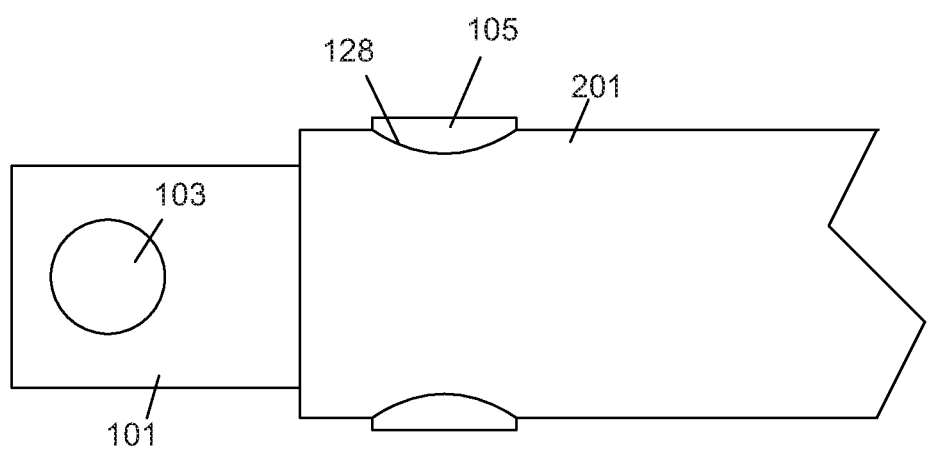

The tongues illustrated in FIGS. 1-8 can be coupled to various types of strut frames. With reference to FIGS. 9-11A, an embodiment of the strut frame 201 is illustrated with the tongue 101 shown in FIGS. 1-2. FIG. 9 illustrates a side view, FIG. 10 illustrates a front view and FIG. 11 illustrates a top view of a first embodiment of a strut frame 201 with the tongue 101 illustrated in FIGS. 1 and 2. In this embodiment, the strut frame 201 is a cylindrical tube having two mounting holes 103 on opposite sides. The ends of the cylinder 105 extend outward beyond the strut frame 201 and the tongue 101 is within the inner diameter of the strut frame 201. The tongue 101 also prevents the cylinder 105 from falling out of the mounting holes 103. The cylinder 105 can rotate within the mounting holes 103 allowing the tongue 101 to rotate as shown in FIG. 9.

Figure 12:
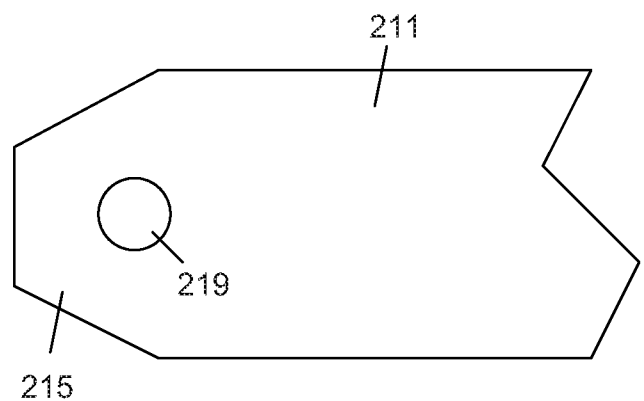
FIG. 12 illustrates a side view of an embodiment of a strut frame.
Figure 13:
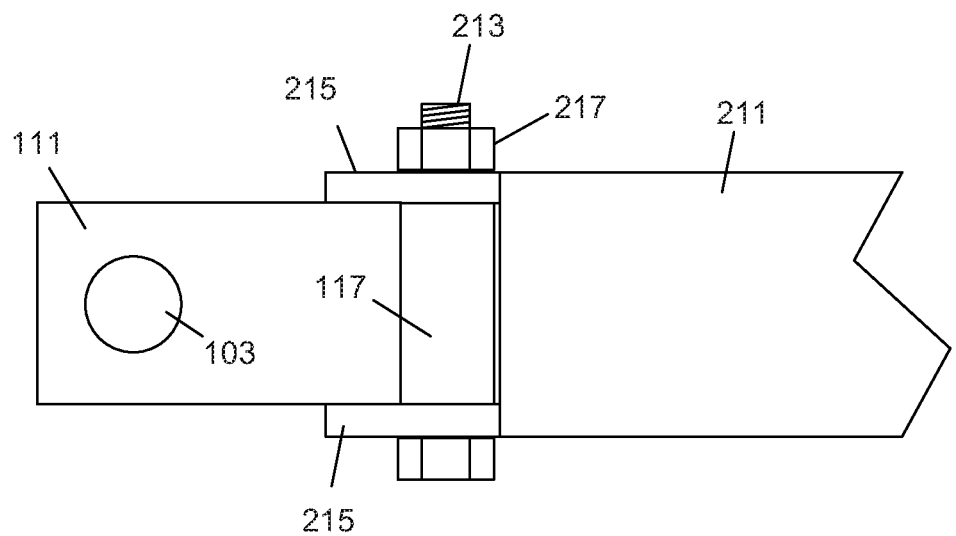
FIGS. 13-15 illustrate top, front and side views of a second embodiment of the double axis frame strut.
Figure 14:
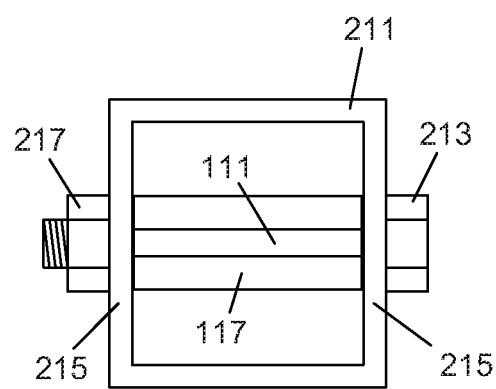
Figure 15:
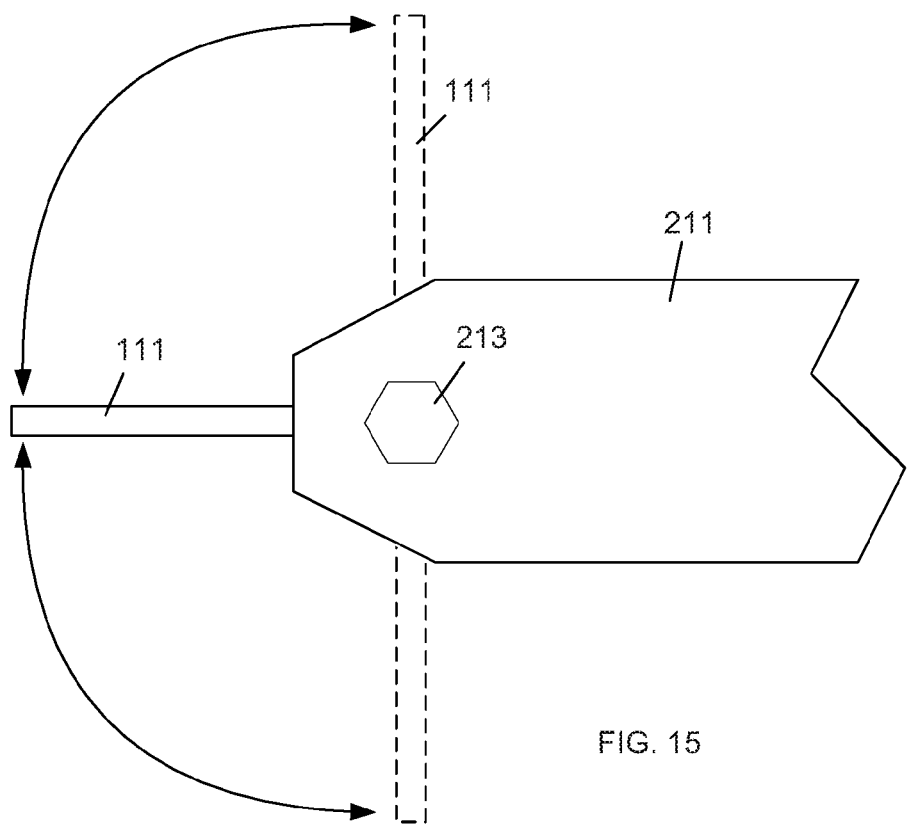

A second embodiment of a strut frame 211 is illustrated in FIGS. 12-14. The strut frame 211 can have a rectangular cross section. FIG. 12 illustrates a side view of the strut frame 211 without a tongue. The strut frame 211 can include two substantially parallel arms 215 and a mounting hole 219 formed in each of the arms 215. FIG. 13 illustrates a top view and FIG. 14 illustrates a front view of the strut frame 211 with the tongue 111 illustrated in FIGS. 3 and 4. In this embodiment, the tongue 111 is placed between the arms 215 with the tube 115 aligned with the mounting holes 105. A threaded bolt 213 extends through mounting holes 105 and a nut 217 is secured to the end of the bolt 213. The tongue 111 can normally rotate about the bolt 213 as shown in FIG. 14. However, if the nut 217 is tightened, the arms 215 can be compressed against the ends of the tube 115 which can prevent the tongue 111 from rotating. FIG. 15 illustrates a side view of the strut frame 211 with the tongue 111. The tongue 111 can have a range motion that can be greater than 180 degrees.

Figure 16:
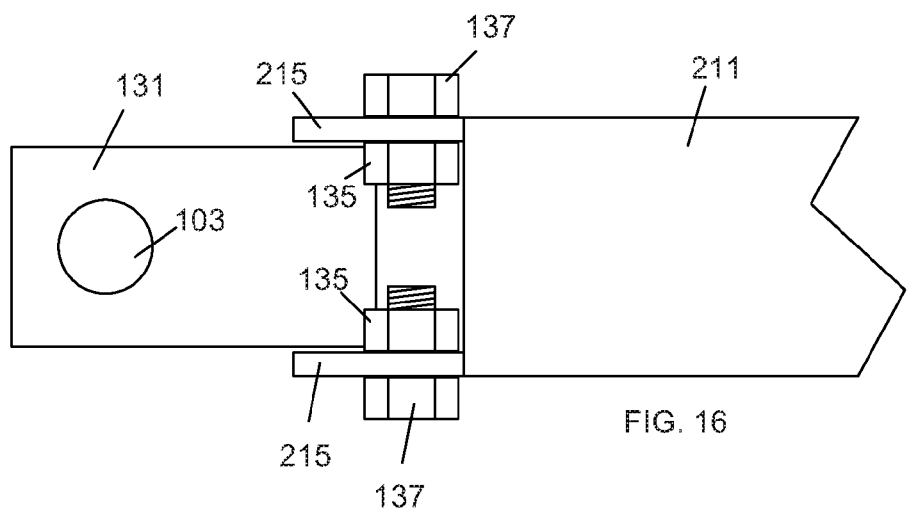
FIGS. 16 and 17 illustrate top and front views of a third embodiment of the double axis frame strut.
Figure 17:
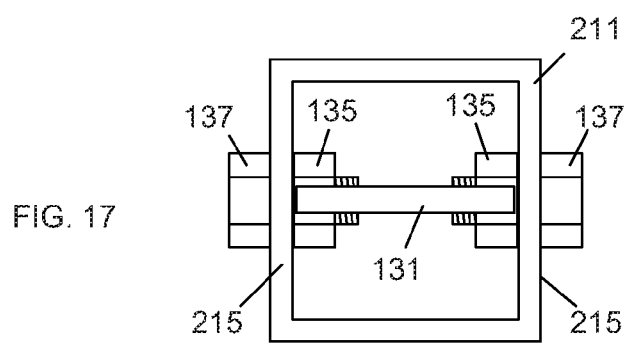

FIG. 16 shows a top view and FIG. 17 shows a front view of a third embodiment of a double axis frame strut that includes the second embodiment of the strut frame 211 combined with the tongue 131 shown in FIGS. 7 and 8. A side view of the strut frame 211 is shown in FIG. 11. In this embodiment, the tongue 131 is coupled to two threaded nuts 135. Bolts 137 are placed through the holes 219 in the strut frame 211 and secured the threaded nuts 135. The tongue 131 can rotated relative to the strut frame 211 as shown in FIG. 14. However, by tightening the bolts 137, the tongue 131 can be rigidly secured to the strut frame 211.

Figure 18:
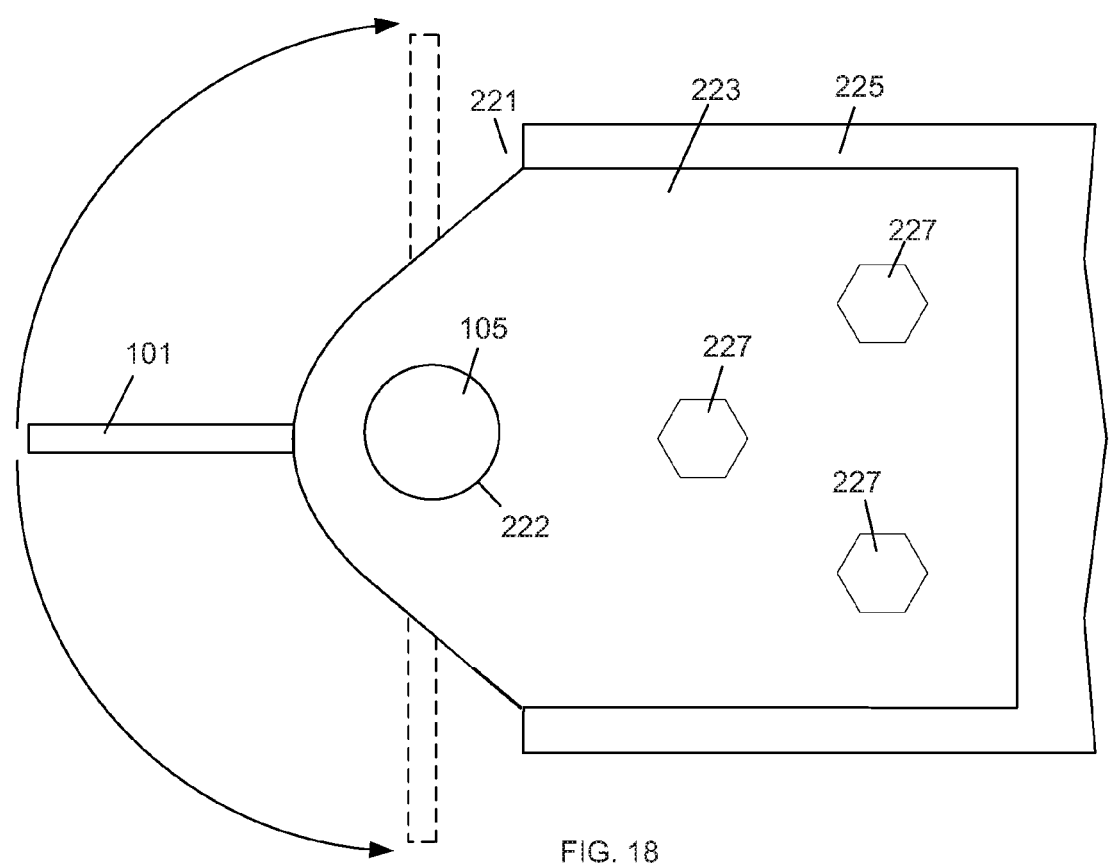
FIGS. 18-20 illustrate side, top and front views of additional embodiments of the double axis frame strut.
Figure 19:
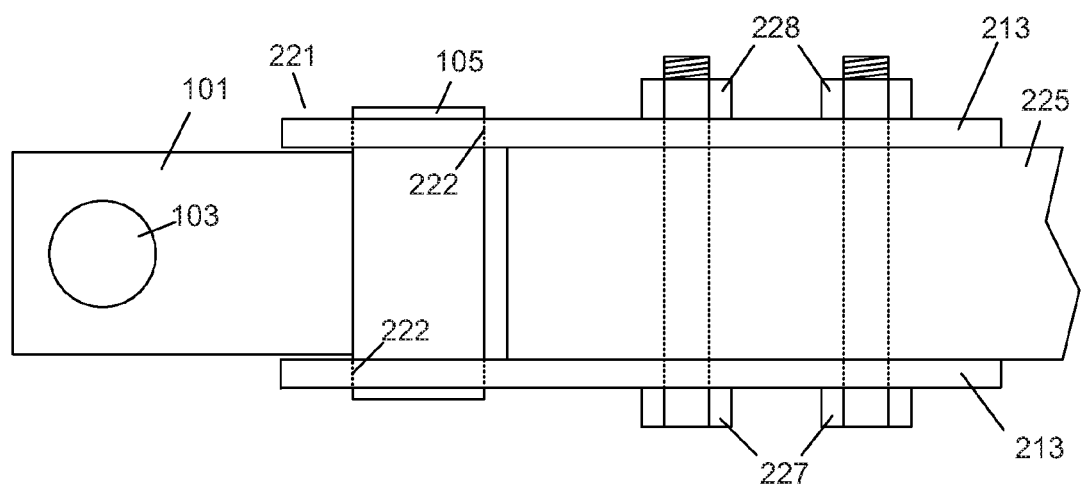
Figure 20:
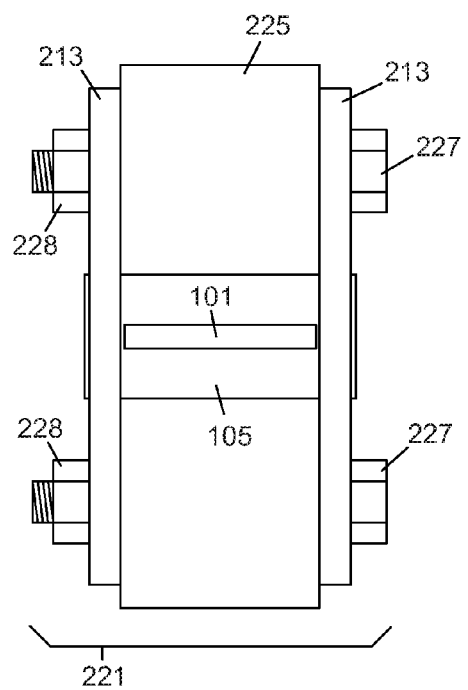
Figure 21:
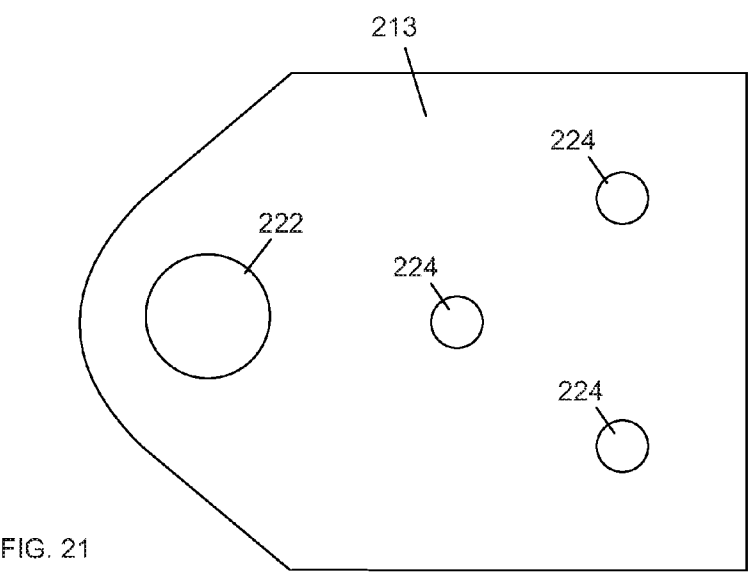
FIG. 21 illustrates a side view of a plate used with the strut frame.

With reference to FIGS. 18-21, additional embodiments of a double axis frame strut are illustrated. FIG. 18 shows a side view of the strut frame 211 with the tongue 101 and FIG. 19 shows a top view of the strut frame 211. In this embodiment, the strut frame 211 includes two plates 213 that are secured to opposite sides of a beam 215. The beam 215 can have a rectangular cross section and may be made of wood, metal, plastic, composites, or any other suitable material. Threaded bolts 227 can be placed through holes 224 in the plates 213 and matching holes through the width of the beam 225. Nuts 228 can be secured to the ends of the bolts 227 to secure the plates 213 to the sides of the beam 225. As illustrated in FIG. 18, the tongue 101 can rotate more than 180 degrees in the strut frame 221. FIG. 20 illustrates a front view of the tongue 101 in the strut frame 211 and FIG. 21 illustrates a side view of the plate 213 alone. The plate 213 can include a mounting hole 222 and a plurality of bolt holes 224.

Figure 22:
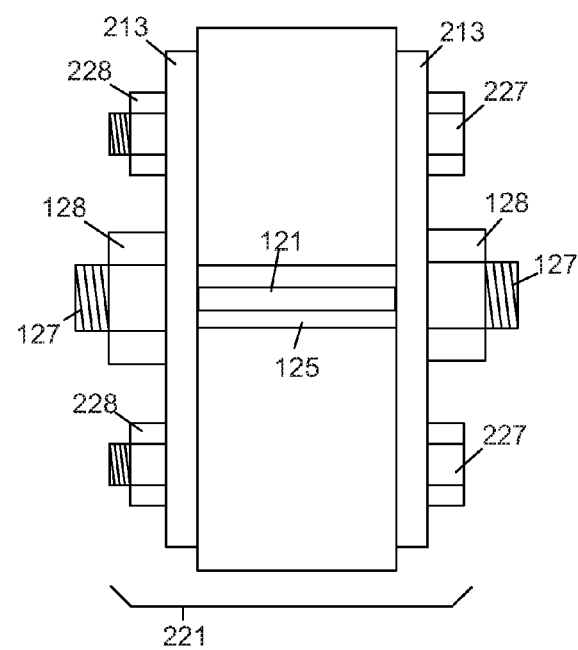
FIG. 22 illustrates a third embodiment of the strut frame with the tongue as illustrated in FIGS. 5 and 6.

FIG. 22 illustrates the third embodiment of the strut frame 221 with the tongue 121 illustrated in FIGS. 5 and 6. In this embodiment, the threaded ends 127 of the cylinder 125 are placed through the holes 222 in the plates 213 and nuts 128 are threaded onto the threaded ends 127. The nuts 128 can be tightened to press the inner surfaces of the plate 213 against the tongue 121. This compression can prevent the tongue 121 from rotating within the frame strut 221.

Figure 23:
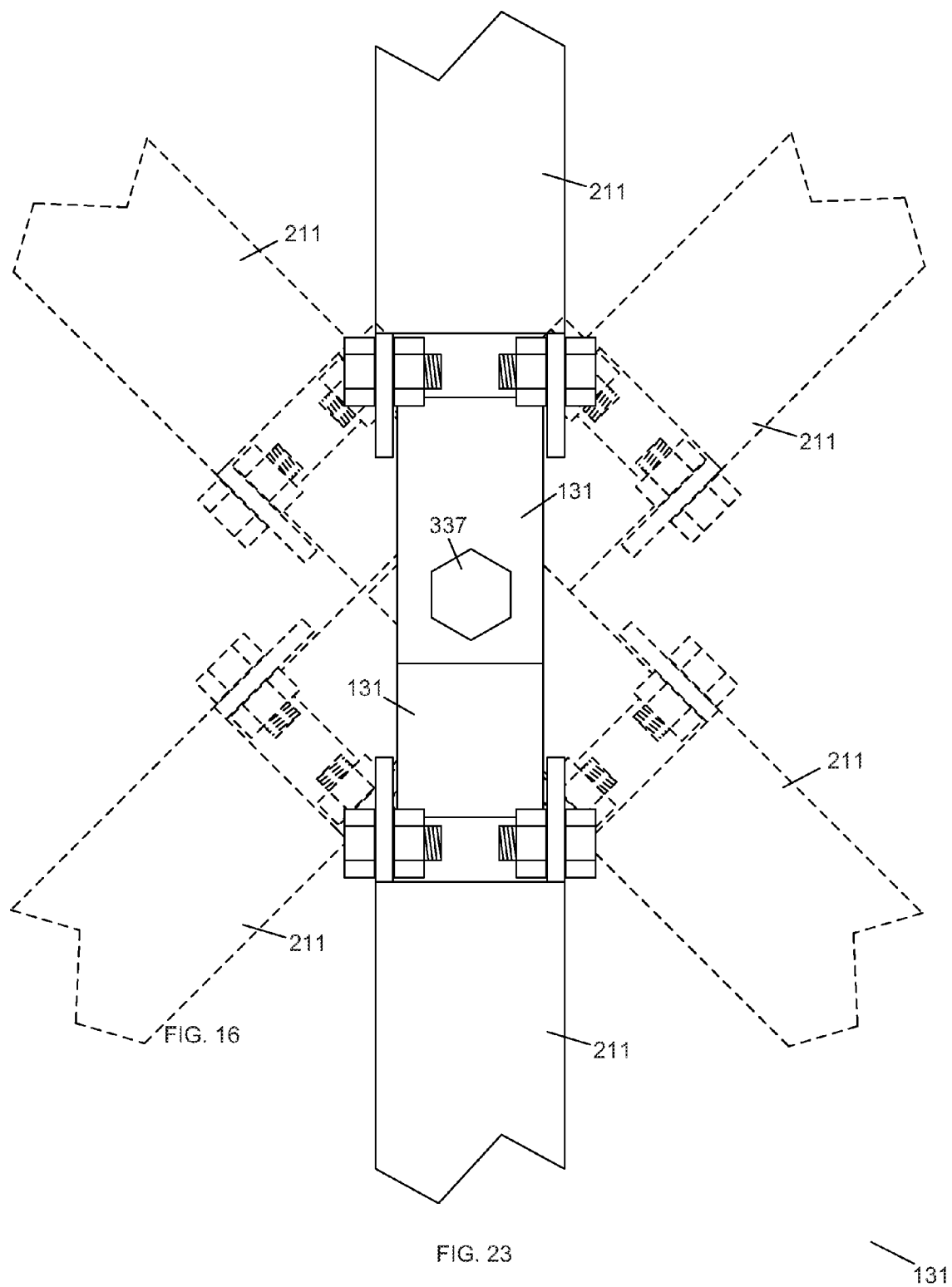
FIGS. 23 and 24 illustrate top and side views of two double axis frame struts coupled together.
Figure 24:
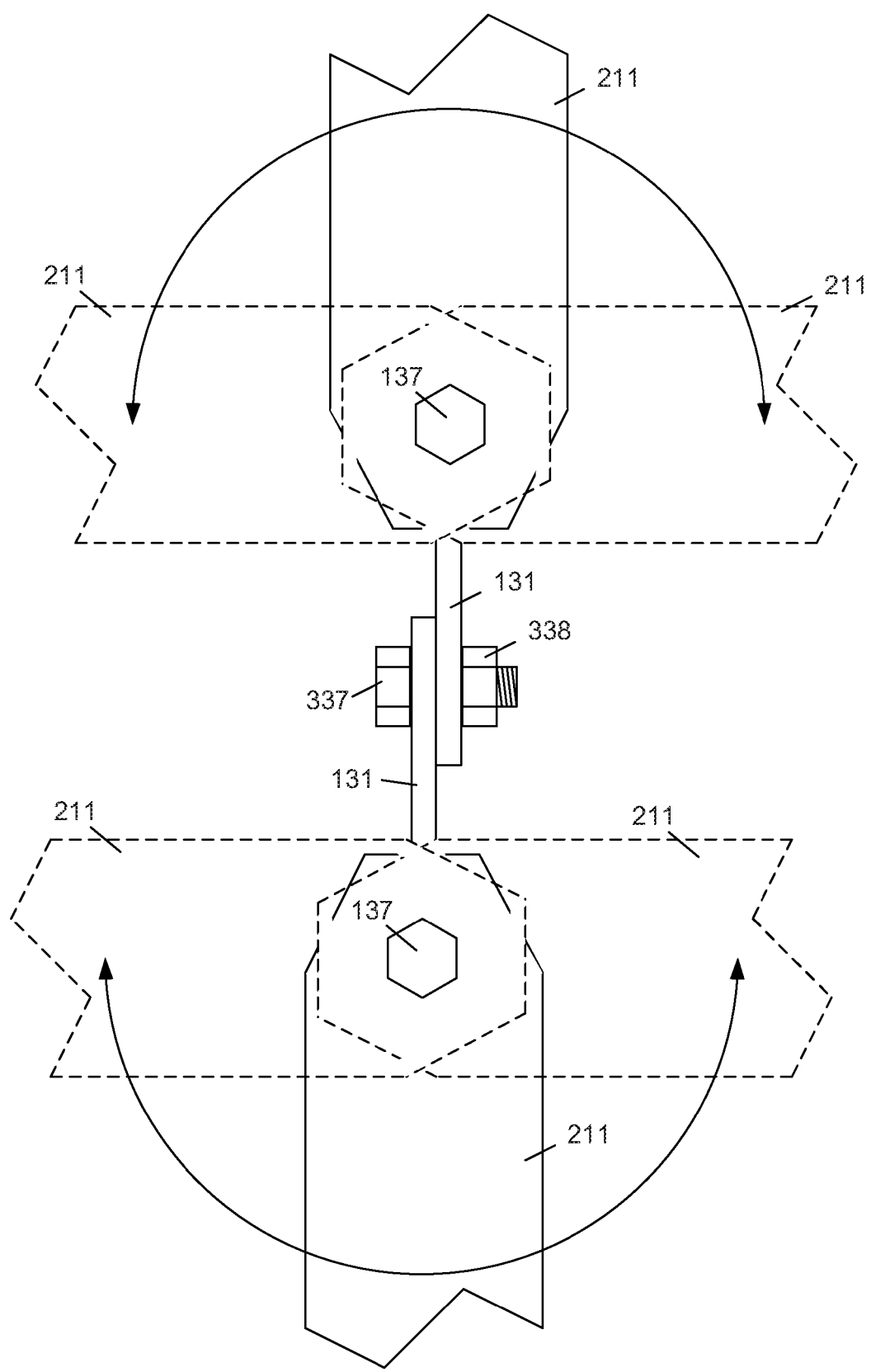

With reference to FIGS. 23 and 24, the inventive double axis frame struts can be joined with the tongues 131 coupled together. With reference to FIG. 23 a top view of the coupled frame struts is illustrated. A bolt 337 can be placed through the holes in the tongues 131 and a nut 338 can be placed around the end of the bolt 337 to secure the tongues 131 together. When the strut frames 211 are moved to the desired positions the bolt 337 and nut 338 can be tightened to secure the tongues 131 together and prevent movement about the axis defined by the bolt 337. FIG. 24 illustrates a side view of the coupled double axis frame struts. The strut frames 211 can rotate about the bolts 137. When the desired positions of the strut frames 211 are determined, the bolts 137 can be tightened to secure the strut frames 211 in the desired positions.

Figure 25:
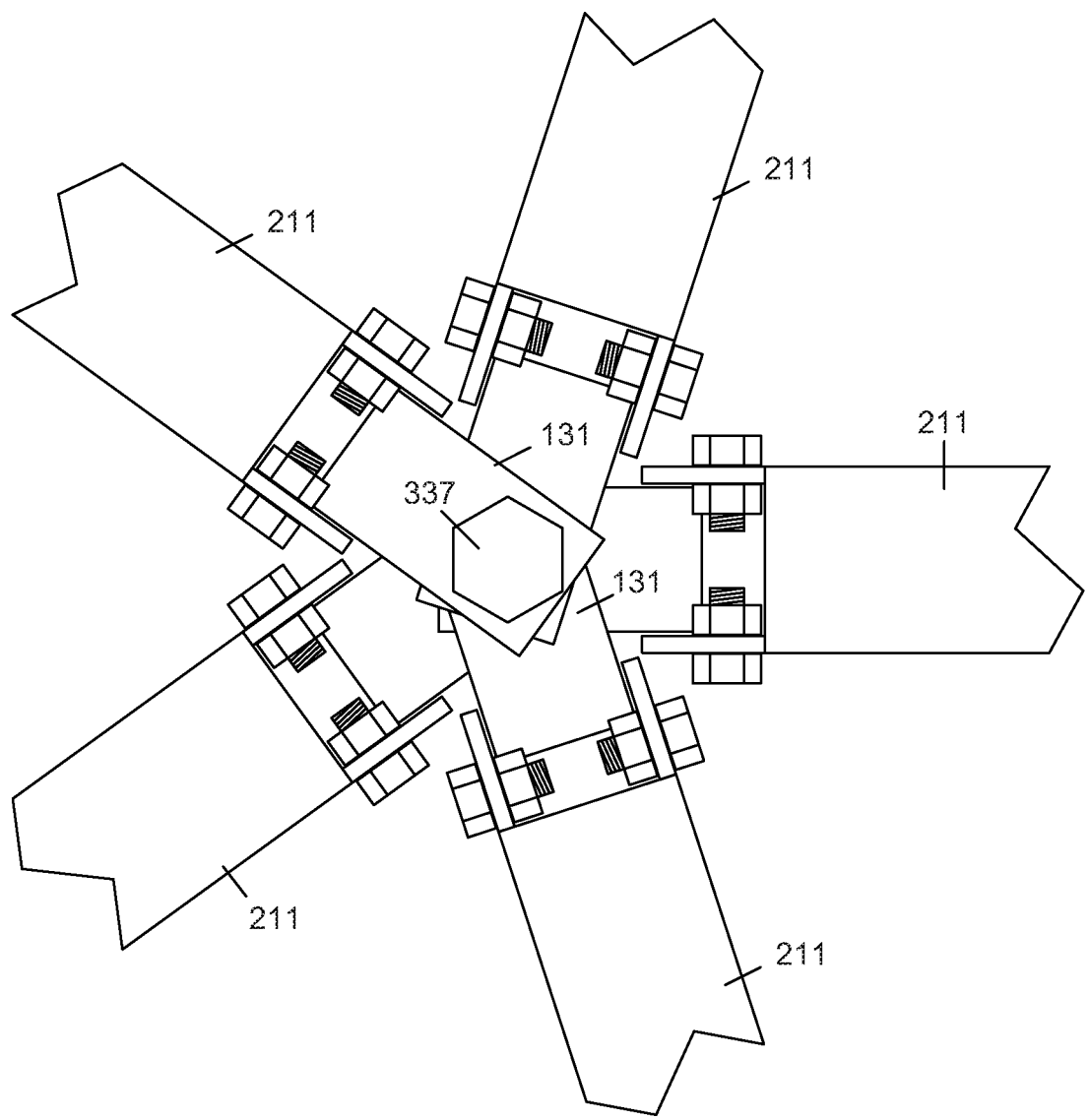
FIGS. 25-27 illustrate hubs that include multiple double axis frame struts.
Figure 26:
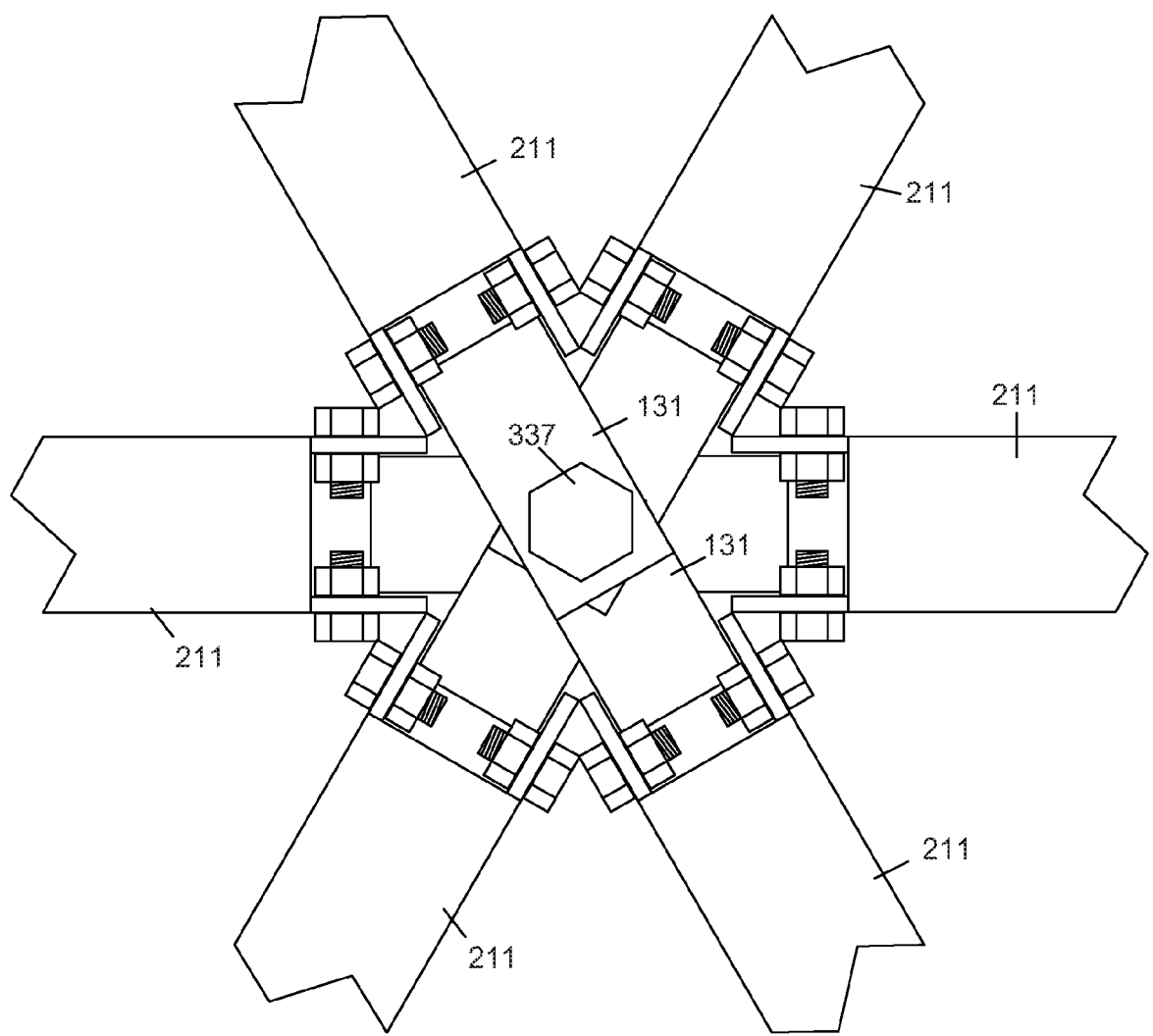
Figure 27:
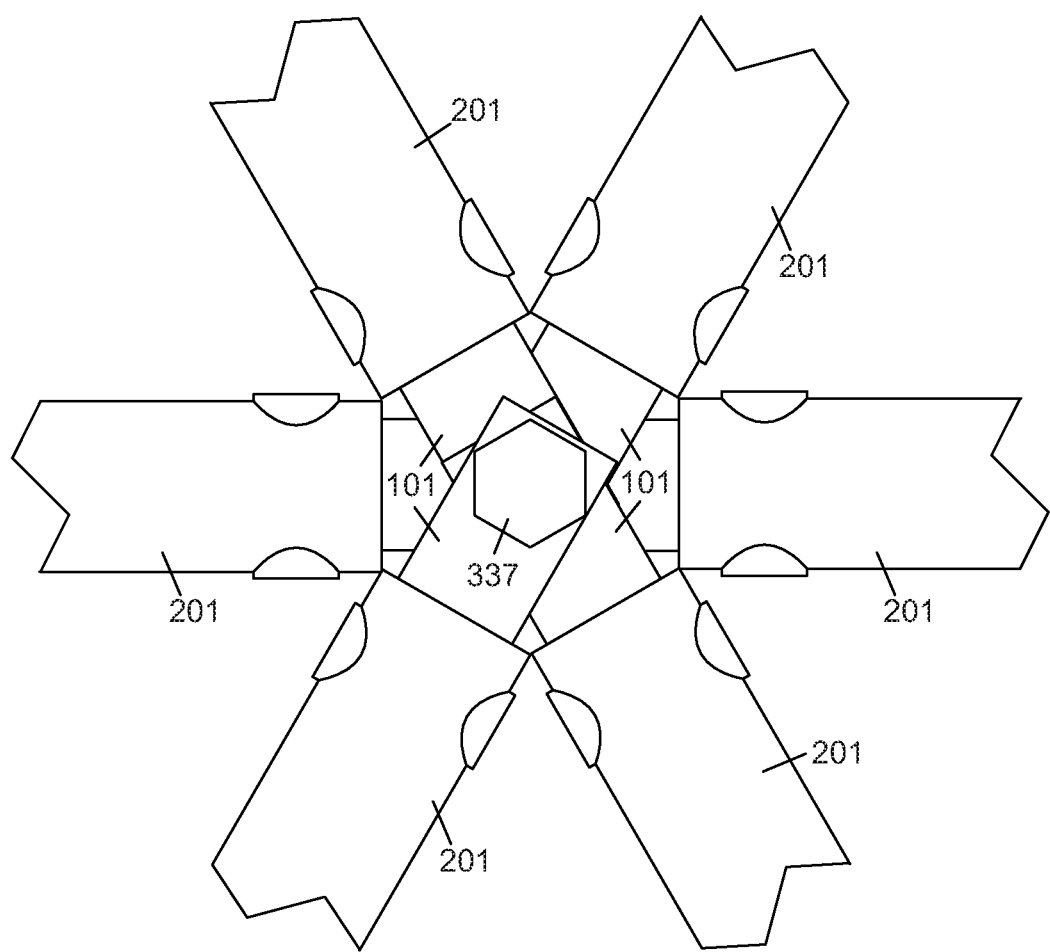

In other embodiments, many double axis frame struts can be joined together. FIG. 25 illustrates five tongues 131 secured together by a single bolt 337. FIG. 26 illustrates six tongues 131 secured together by a single bolt 337. FIG. 27 also illustrates six tongues 201 together by a single bolt 337. The strut frames can be evenly or unevenly distributed around the bolt 337. These types of multiple double axis frame strut hubs can be particularly useful when constructing frame supported structures such as geodesic domes.

Figure 28:
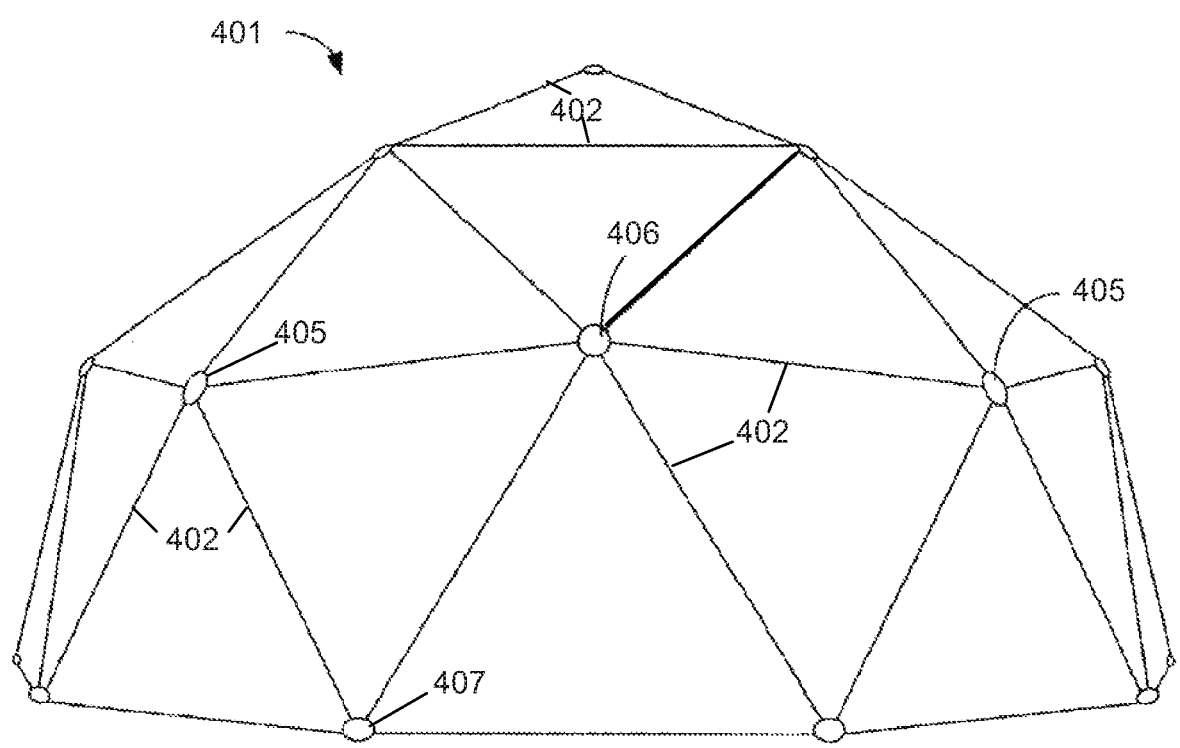
FIG. 28 illustrates a geodesic dome.

With reference to FIG. 28, a geodesic dome 401 is illustrated. A geodesic dome 401 is a type of structure constructed with straight elements that form interlocking polygons. The structure is comprised of a complex network of polygons, usually triangles, which form a roughly spherical surface. The more complex the network of polygons, the more closely the dome approximates the shape of a sphere. In the embodiment shown in FIG. 28, there are two types of hubs 405, 406 that join the ends of the beams 402. Hub 406 is a connector taking a shape similar to a hexagon, in that it fastens to six beams 402, whereas hub 405 takes a shape similar to a pentagon. The hub 207 at the bottom edge of the geodesic dome 401 is similar to the hub 406 with the lower two beams connected to hub 406 omitted. The hubs 405, 406, 407 can be similar to the hubs illustrated in FIGS. 25-27. In other embodiments, the inventive double axis frame struts can be used for other structures.

Figure 29:
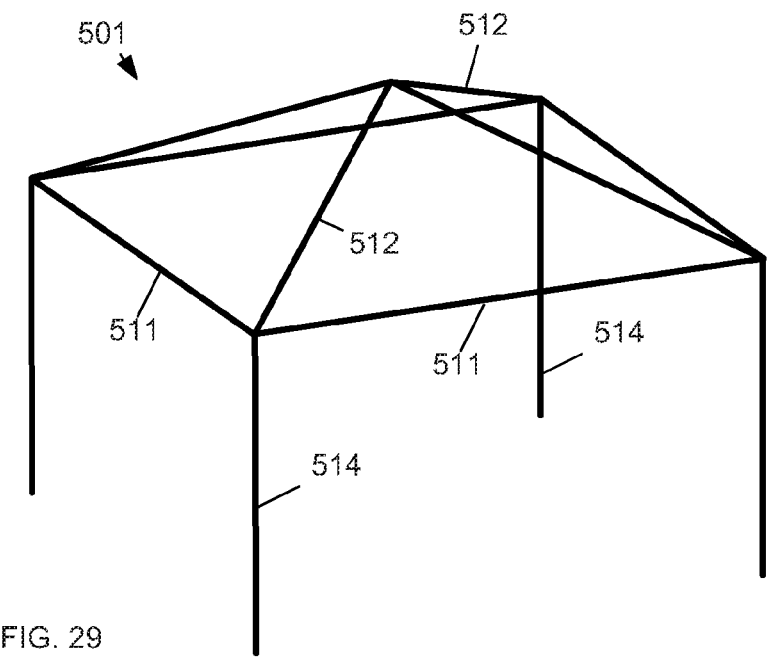
FIGS. 29 and 30 illustrate free standing structures that can be constructed with the double axis frame struts.

FIG. 29 shows an isometric view of an exemplary embodiment of a beam and truss structure 501 that can be covered with a canopy. The beam and truss structure 501 comprises a plurality of beams 511, a plurality of truss beams 512, and a plurality of legs 514. Each of these components can rigidly together as described above using the inventive double axis frame struts.

Figure 30:
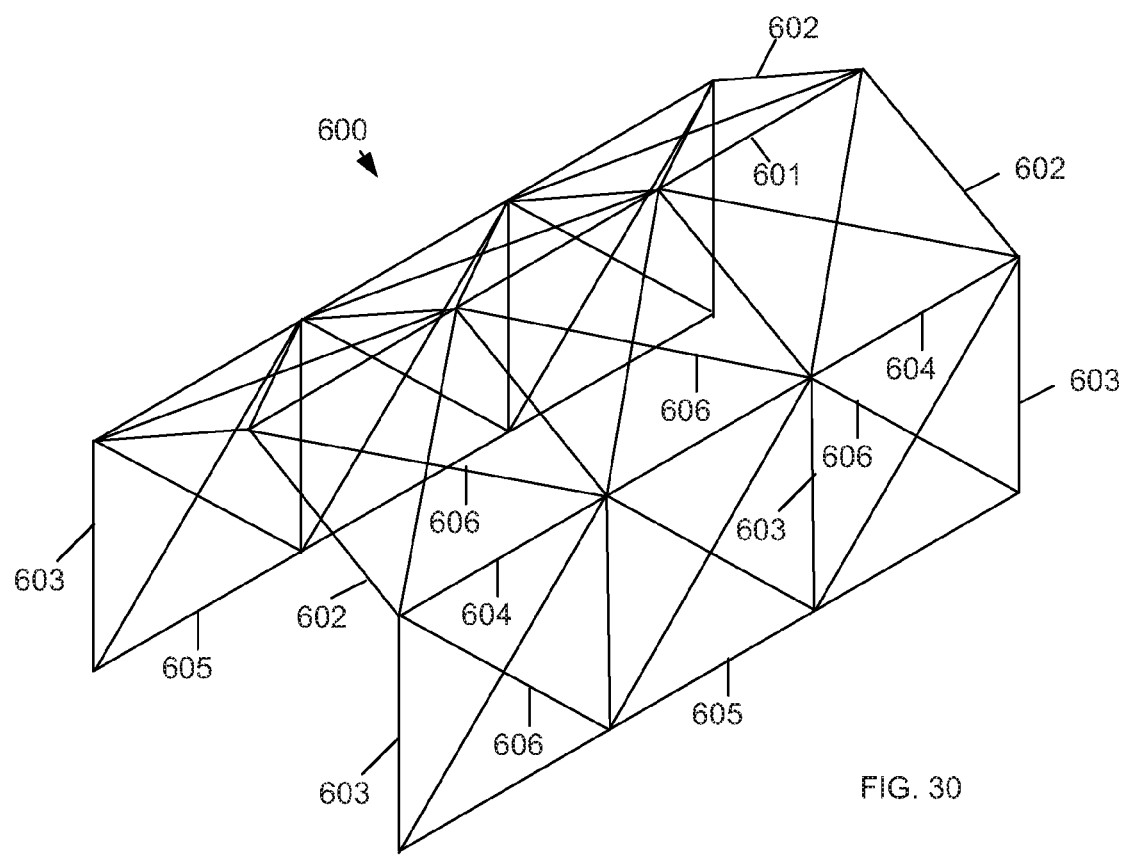

FIG. 30 illustrates another exemplary embodiment of a free standing structure. The structure 600 comprises a ridge beam 601 at the apex of structure 600 that spans between pairs of truss beams 602. Leg beams 603 are coupled to the truss beams 602 at the lower end of truss beams 602. Upper leg beams 604 extend between the tops of the leg beam 602. Lower leg beams 605 extend between the lower ends of the legs 604 in parallel to the upper leg beams 604. Additional cross beams 606 can be placed diagonally between the ridge beam 601, the truss beams 602, the leg beams 603, the upper leg beams 604 and the lower leg beams 605. It should be understood that structure 600 could comprise any number of sections. Additionally, the various components forming structure 600 can be formed from any suitable material, such as, but not limited to, steel, metal alloys and/or composite materials, that provide sufficient strength for the stresses that are experienced by a structure such as structure 100. The exemplary structure 600, or variations of exemplary structure 600, could be used as, but not limited to, a structure for a garage/canopy for a vehicle, a motorcycle, a bicycle, a covered walkway, a greenhouse, a party tent, an animal shelter, a pavilion tent, a temporary shelter, a storage facility, a boat garage/canopy. Additionally, it should be understood that exemplary structure 600, or variations of exemplary structure 600, could be scaled in size for the intended application.

The angle or pitch of the rooftop of the illustrated structures is determined by the width of the supporting structure connected to the truss beams. An advantage of the double axis connection is that it will adjust and lock to any angle required by the supporting structure up to 180 degrees or more at the strut end.

In an embodiment, the inventive double axis frame struts can be used with telescopic struts. In these embodiments, the roof pitch angle could be adjusted to any desired degree of slope. The design could also be incorporated into an adjustable truss. FIGS. 31-35 illustrate embodiments of an adjustable length beam 700. FIG. 31 illustrates an embodiment of a telescopic beam 700 that includes an inner member 701 and an outer tube 703. The inner member can have a pin mechanism 709 that can engage one of a series of holes 707 in the outer tube 703. The telescopic configuration can rotate or extend as needed for any framing requirement. This locking strut connection can also be used with any pipe or tubing strut material, metal structural pipe, EMT or plastic HDPE and PVC.

FIG. 32 illustrates side view of an embodiment of the inner member 701. FIG. 33A illustrates a cross sectional view of the inner member 701 with the pin mechanism 709 in the expanded state. The pin mechanism may include one or two rounded pins that are coupled to the ends of a spring mechanism. The pins may extend through holes in the side wall of the inner member 701. FIG. 33B illustrates the inner member with the inner member 701 with the pins compressed so the ends of the pins do not protrude beyond the outer diameter of the inner member 701. In the compressed state, the inner member can be moved to change the length of the adjustable length beam 700. Once the inner member 701 is placed in the desired extension or position the pin mechanism 709 can be released to engage one or more holes in the outer tube 703.

The cross section of the adjustable length beam 700 can be any geometric shape. FIG. 34 illustrates an end view of an adjustable length beam having a rectangular cross section and FIG. 35 illustrates another embodiment of the adjustable length beam having a circular cross section.

Figure 36:
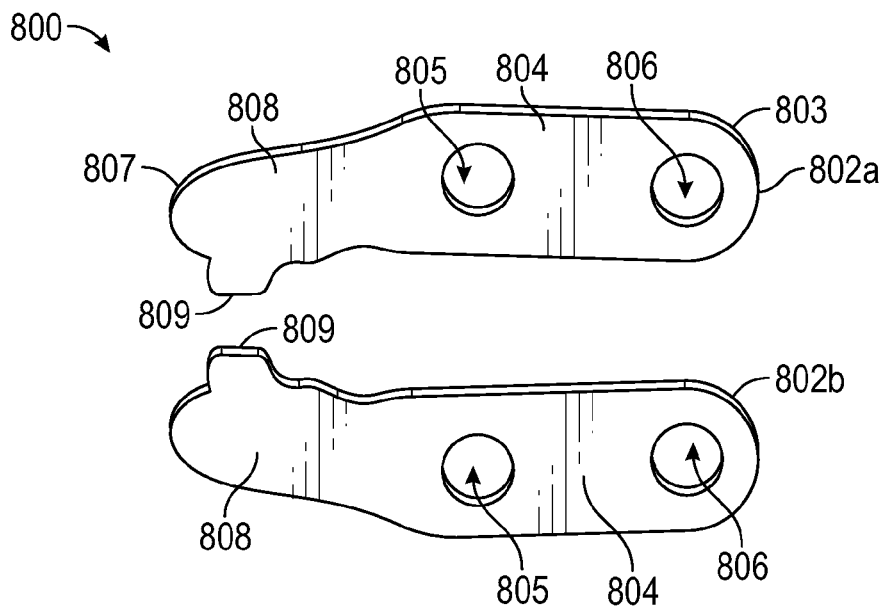
FIG. 36-38 illustrate an embodiment of a scissor type connector.
Figure 37:
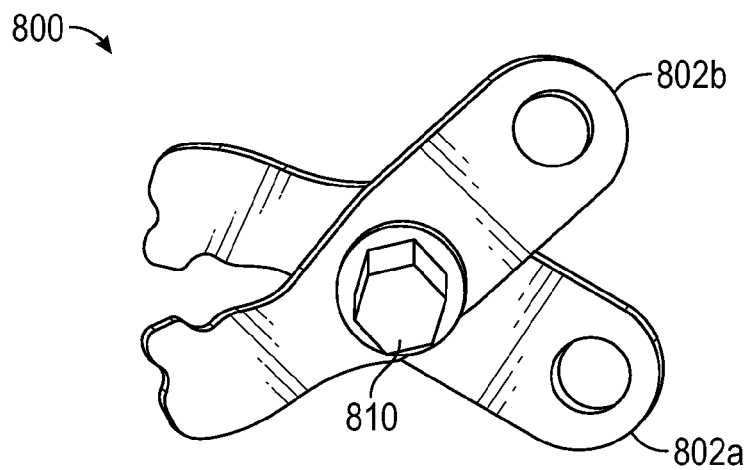
Figure 38:
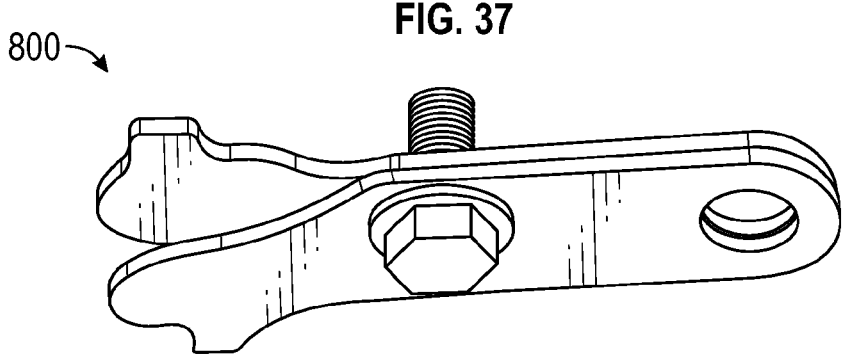

FIGS. 36-38 illustrate another embodiment of a tongue connector 800 that operates as a scissor clip for double axis frame struts. In this embodiment, the connector 800 consists of two blades 802a, 802b that are identically formed with a body portion 804 and an arm portion 808. A first hole 805 is provided on the body portion 804 in the approximate center of each blade 802a, 802b, and a second hole 806 is provided on the body portion near the end thereof, i.e., the hub end 803. The first hole 805 could be slightly off center to adjust for tension in a particular application. The arm portion 808 includes a tab 809 that extends outward from the arm portion near the end thereof, i.e., the strut end 807. The dimensions of the blades 802a, 802b and the angle of the arm portion 808 can be varied depending on the application.

In one embodiment, the tabs 809 extend from the arm portions 808 in an orientation that is perpendicular to the length of the body portion 804.

As shown in FIG. 37-38, the blades 802a, 802b are rotatably coupled together by a single bolt 810 inserted through first hole 805, which allows the connector 800 to operate in a scissor-type action between an open position (FIG. 37) and a closed position (FIG. 38).

Figure 39:
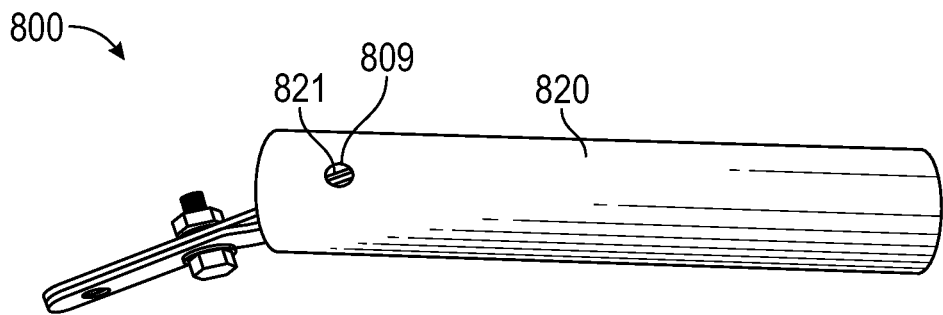
FIG. 39 illustrates the connector of FIGS. 36-38 coupled with a cylindrical strut.

Referring to FIG. 39, a hollow tubular strut 820 is shown with a tab opening 821 near the end thereof. A corresponding tab opening (not shown) is formed on the other side of the strut 820 in symmetrical opposition to tab opening 821. The tab openings 821 on the strut 820 are configured to accept the tabs 809 extending from blades 802a, 802b.

In use, the assembled connector 800, i.e., the blades 802a, 802b as coupled for rotation by bolt 810, is manipulated to insert the strut end 807 of connector 800 inside the strut 820. The connector 800 is further manipulated toward the closed position such that the tabs 809 are extended to insert into the tab openings 821. The locking holes 806 on the connector 800 are then aligned and coupled together, e.g., by another bolt.

Figure 40:
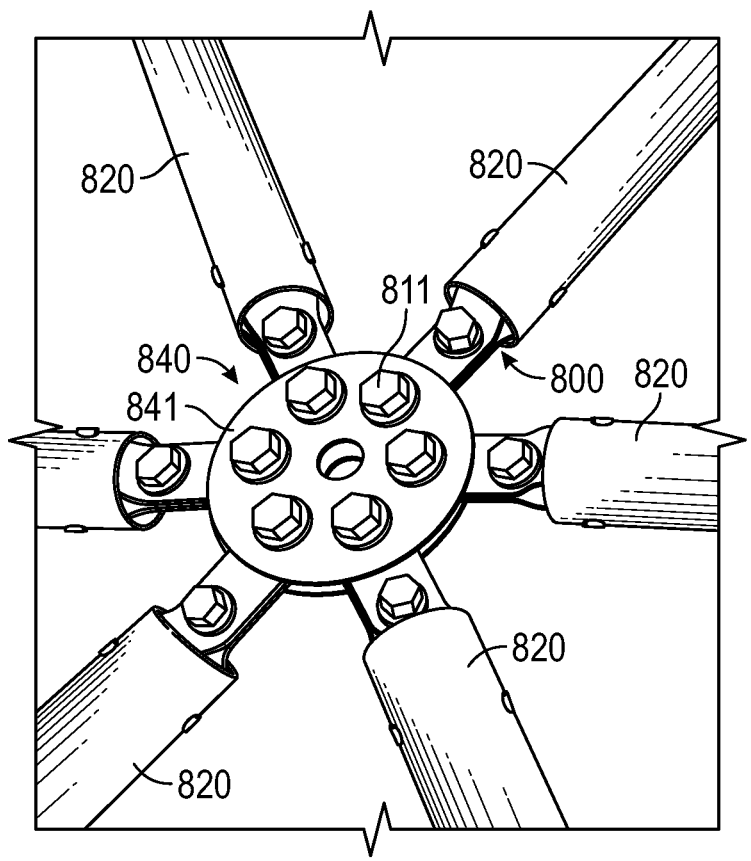
FIG. 40 illustrates multiple connectors as in FIGS. 36-38 coupled with multiple struts and commonly connected to a hub.

FIG. 40 illustrates multiple struts 820 coupled by respective connectors 800 to a central hub 840. In this embodiment, the hub 840 is formed with a pair of identical round plates 841 each having multiple corresponding holes for connecting with the connectors 800. Thus, each connector 800 is fitted within a respective strut 820 as described above, and each connector is connected to the hub 840 by fastener 811 secured through corresponding openings in the plates 841 and the second hole 806 of the connector. Thus, each strut 820 is movable along two different axes, namely up and down by virtue of the tabs 809 inserted through strut openings 821, and side to side by rotating the connector 800 at the second hole 806.

Figure 41:
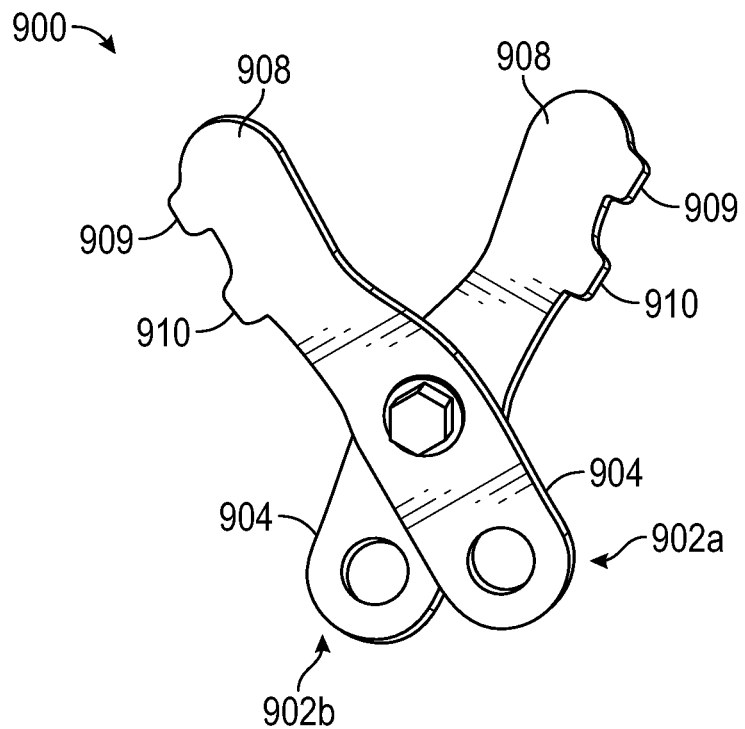
FIG. 41 illustrates an alternative embodiment of a scissor type connector.

FIG. 41 illustrates yet another embodiment of a scissor clip connector 900. In this embodiment, the connector 900 consists of two blades 902a, 902b that are identically formed with a body portion 904 and an arm portion 908. However, in this embodiment, the arm portion 908 includes two tabs 909, 910 rather than just one as in the previous embodiment, and the tabs extend outward from the arm portion near the end thereof. This embodiment is useful for providing a fixed angle setting for the strut.

Figure 42:
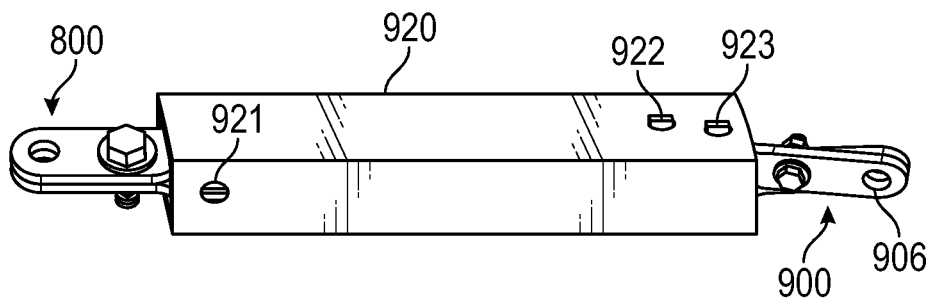
FIG. 42 illustrates the connector of FIG. 41 coupled with a square strut.

For example, FIG. 42 shows a strut 920 formed of square tubing with a first set of openings 921 formed in one end of the strut for accepting the tabs of connector 800, as described previously. Strut 920 also has a paired set of openings 922, 923 formed in the other end of the strut for accepting the tabs 909, 910 of connector 900. Openings 921 are formed on opposing sides of the strut 920, while openings 922, 923 are formed on the other opposing sides of the strut. Thus, while strut 900 is only capable of single axis movement via second hole 906 of the connector 900, the strut is also capable of double axis movement at the other end for connector 800 as previously described.

Figures 43, 44:
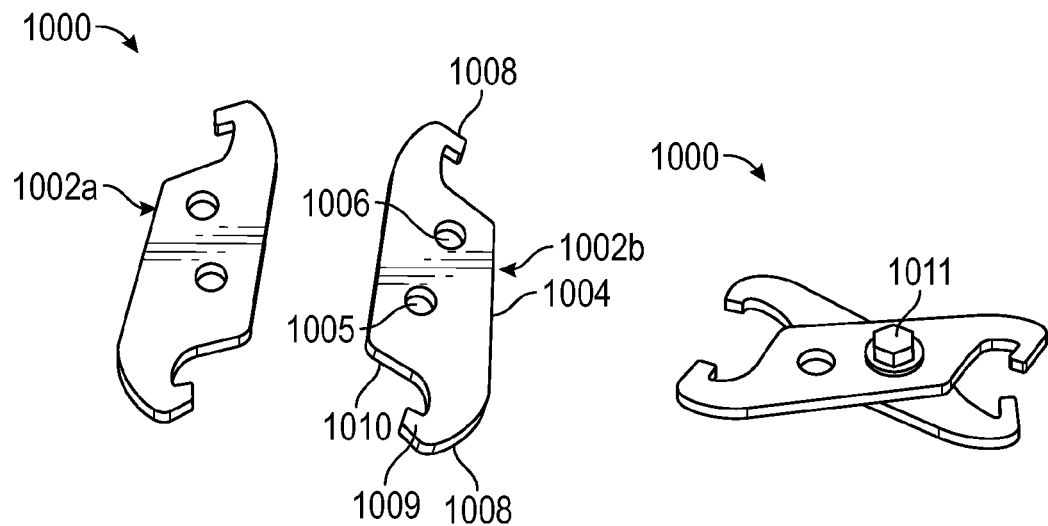
FIGS. 43-44 illustrate another alternative embodiment of a scissor type connector.
Figures 45, 46:
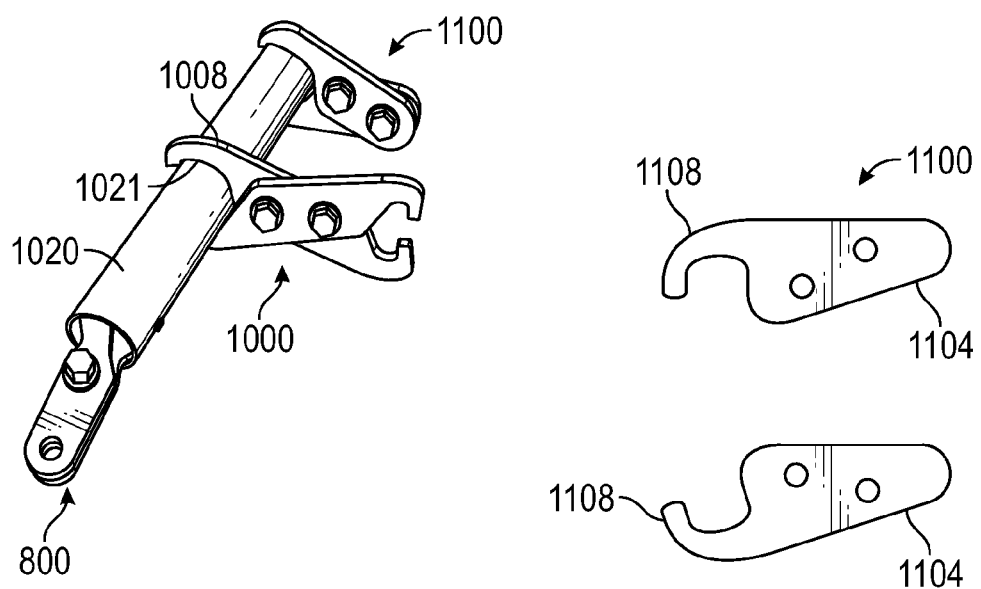
FIG. 45 illustrates the connector of FIGS. 43-44 coupled with a cylindrical strut.
FIG. 46 illustrates yet another alternative embodiment of a scissor type connector.

Referring now to FIGS. 43-45, another embodiment of a scissor clip connector 1000 is illustrated. Connector 1000 consists of two blades 1002a, 1002b that are identically formed with a body portion 1004 and hook portions 1008 formed on both ends of the body portion. A first hole 1005 and a second hole 1006 are provided on the body portion 1004. The holes 1005, 1006 are symmetrically placed on either side of the longitudinal axis that extends along the length of the connector 1000. The hook portions 1008 have a rounded edge on one side thereof that resolves into a hook 1009 having a recess 1010 formed underneath the hook such that the hook can engage an opening formed on the strut.

FIG. 44 illustrates how the blades 1002a, 1002b are coupled together with a fastener 1011 through one of the holes 1005, 1006. FIG. 45 illustrates the hooks 1008 of connector 1000 secured to openings 1021 on the outside of strut 1020. The openings 1021 may be formed anywhere along the strut. A connector 800, as previously described, is also secured to the end of strut 1020.

Another connector 1100 is illustrated in FIG. 46. This embodiment is similar to the embodiment of FIGS. 43-35, with a body portion 1004, but only a single hook portion 1008 formed on one end of the connector 1100. This embodiment is useful for clamping onto a strut with one end of the connector 1100, and being secured to a hub (not shown) with the other end of the connector, as shown in FIG. 45.

The scissor clip embodiments can be used to join cylindrical tubing, square tubing, or structural frames of any kind with only two opposing penetrating holes required per clip, and at many different angles. The design allows for many types of applications that can be run in conduit or tubing, such as sprinkler lines, low voltage wiring, or other utilities.

Smaller clips may be made from 14 gauge stainless steel, while larger clips may be made from ½ inch or ¾ inch mild steel plate or abrasion resistant plate for even larger applications.

It will be understood that the inventive system has been described with reference to particular embodiments, however additions, deletions and changes could be made to these embodiments without departing from the scope of the inventive system. Although the strut frame connector has been described to include various components, it is well understood that these components and the described configuration can be modified and rearranged in various other configurations.

The invention claimed is:

1. A strut frame and connector, comprising:
   a strut frame member having a surface enclosing a hollow interior, an open end, and a pair of openings formed through the surface near the open end to oppose each other, the pair of openings defining a first axis of rotation:
   a pair of connector portions rotatably coupled together, each connector portion is a flat blade having a body portion and an arm portion extending from the body portion, the body portion having a first hole and a second hole, the arm portion having at least one tab extending from the arm portion;
   one of the connector portions is inverted and coupled to the other one of the connector portions with a first fastener secured through the first holes;
   wherein the connector portions are rotated to insert the arm portions into the hollow interior of the strut frame member, then the connector portions are rotated again such that the tabs engage respective opposed openings on the strut frame member, then the second holes are aligned and the connector portions secured together through the second holes;
   wherein the strut frame member is rotatable about the first axis of rotation and a second axis of rotation, the second holes defining the second axis of rotation that is perpendicular to the first axis of rotation.

2. The strut frame and connector of claim 1, the tabs are configured to extend outwardly from the arm portions away from each other when the connector portions are rotated and coupled together to engage the respective openings from inside the strut frame member.

3. The strut frame and connector of claim 1, the arm portions extend at an acute angle away from the body portions.

4. The strut frame and connector of claim 3, the tabs extend from the arm portions at an angle that is orthogonal to a length of the body portion.

5. The strut frame and connector of claim 1, the first holes are centrally located on the body portions.

6. The strut frame and connector of claim 1, the first holes are located off center on the body portions.

7. The strut frame and connector of claim 1, the second holes are located on the body portions distally from the arm portions.

8. The frame and strut connector of claim 1, the first and second holes are located off center on each body portion and off axis to a length of each body portion.

9. A strut frame and connector, comprising:
a strut frame member having a surface enclosing a hollow interior, an open end, and a pair of openings formed through the surface near the open end to oppose each other, the pair of openings defining a first axis of rotation;
a pair of connector portions rotatably coupled together, each connector portion is a flat blade having a body portion and an arm portion extending at an acute angle from the body portion, the body portion having a first hole centrally located relative to the connector portion and a second hole distally located relative to the arm portion, the arm portion having at least one tab extending from the arm portion at a right angle relative to a length of the body portion;
one of the connector portions is inverted and coupled to the other one of the connector portions with a first fastener secured through the first holes;
wherein the connector portions are rotated to insert the arm portions into the hollow interior of the strut frame member, then the connector portions are rotated again such that the tabs engage respective opposed openings on the strut frame member, then the second holes are aligned and a second fastener secured through the second holes;
wherein the strut frame member is rotatable about the first axis of rotation and a second axis of rotation the second holes defining the second axis of rotation that is perpendicular to the first axis of rotation.

10. The strut frame and connector of claim 9, the tabs are configured to extend outwardly from the arm portions away from each other when the connector portions are rotated and coupled together to engage the respective openings from inside the strut frame member.

* * * * *